US008812013B2

(12) United States Patent
Agarwal et al.

(10) Patent No.: US 8,812,013 B2
(45) Date of Patent: Aug. 19, 2014

(54) PEER AND COMPOSITE LOCALIZATION FOR MOBILE APPLICATIONS

(75) Inventors: Sharad Agarwal, Seattle, WA (US);
Paramvir Bahl, Sammamish, WA (US);
Nilanjan Banerjee, Amherst, MA (US);
Ranveer Chandra, Kirkland, WA (US);
Alastair Wolman, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 673 days.

(21) Appl. No.: 12/395,386

(22) Filed: Feb. 27, 2009

(65) Prior Publication Data

US 2010/0105409 A1    Apr. 29, 2010

Related U.S. Application Data

(60) Provisional application No. 61/108,752, filed on Oct. 27, 2008.

(51) Int. Cl.
*H04W 24/00*    (2009.01)
*H04M 11/04*    (2006.01)
*H04B 1/38*    (2006.01)
*H04B 1/04*    (2006.01)

(52) U.S. Cl.
USPC ............... 455/456.1; 455/404.2; 455/456.2; 455/456.3; 455/456.4; 455/457; 455/574; 455/127.4; 455/41.1; 455/41.2

(58) Field of Classification Search
USPC ............ 455/404.2, 456.1–456.6, 457, 41.1, 455/41.2, 574, 553, 127.4
See application file for complete search history.

(56) References Cited

U.S. PATENT DOCUMENTS

| | | |
|---|---|---|
| 6,286,104 B1 | 9/2001 | Buhle et al. |
| 6,700,535 B2 | 3/2004 | Gilkes |
| 6,819,286 B2 | 11/2004 | Armbruster |
| 7,047,022 B2 | 5/2006 | Aoyama |
| 7,171,233 B2 | 1/2007 | Sanchez |
| 7,577,441 B2 | 8/2009 | Nonoyama |

(Continued)

FOREIGN PATENT DOCUMENTS

| | | |
|---|---|---|
| WO | 0157547 A1 | 8/2001 |
| WO | 0158098 A2 | 8/2001 |

OTHER PUBLICATIONS

Magedanz et al., "GRIPS Generic Radio based Indoor Positioning System", Workshop on Positioning, Navigation and Communication (WPNC'05), 2005.*

(Continued)

*Primary Examiner* — Jinsong Hu
*Assistant Examiner* — Dung Hong
(74) *Attorney, Agent, or Firm* — Stephen A. Wight; Carole Boelitz; Micky Minhas

(57) ABSTRACT

A system and method for peer based localization system using radio technology, such as Bluetooth or Wi-Fi ad-hoc technology that enables mobile devices such as cell phones, smart phones, laptops, handheld communication devices, handheld computing devices, satellite radios, global positioning systems, PDAs, etc. to discover their physical location relative to one another. In addition, the peer based localization can use a plurality of radio technologies to increase the accuracy of the physical location estimates. Additionally or alternatively, the peer based localization technique can be combined with infrastructure based location techniques, such as triangulation, GPS, or infrastructure based Wi-Fi localization in order to transpose virtual coordinates into physical coordinates.

20 Claims, 12 Drawing Sheets

(56) References Cited

U.S. PATENT DOCUMENTS

| | | | |
|---|---|---|---|
| 2003/0110291 A1* | 6/2003 | Chen | 709/244 |
| 2003/0134647 A1* | 7/2003 | Santhoff et al. | 455/456 |
| 2004/0120278 A1* | 6/2004 | Krantz et al. | 370/328 |
| 2004/0147223 A1* | 7/2004 | Cho | 455/41.2 |
| 2004/0192219 A1* | 9/2004 | Malone et al. | 455/73 |
| 2004/0192331 A1* | 9/2004 | Gorday et al. | 455/456.1 |
| 2005/0143101 A1* | 6/2005 | Kyperountas et al. | 455/456.6 |
| 2005/0221813 A1* | 10/2005 | Rajahalme et al. | 455/422.1 |
| 2006/0166681 A1 | 7/2006 | Lohbihler | |
| 2006/0234631 A1 | 10/2006 | Dieguez | |
| 2006/0245601 A1 | 11/2006 | Michaud et al. | |
| 2008/0071713 A1* | 3/2008 | Tung | 706/21 |
| 2008/0216125 A1 | 9/2008 | Li | |
| 2010/0004005 A1 | 1/2010 | Pereira et al. | |
| 2011/0091055 A1 | 4/2011 | LeBlanc | |
| 2011/0241935 A1 | 10/2011 | Miocinovic et al. | |

OTHER PUBLICATIONS

John Krumm and Ken Hinckley, The NearMe Wireless Proximity Server, UbiComp 2004. The Sixth International Conference on Ubiquitous Computing, pp. 283-300. Sep. 7-10, 2004, Nottingham, England, http://research.microsoft.com/users/kenh/papers/NearMe.pdf, 18 pages.

F. Forno, G. Malnati and G. Portelli, Design and Implementation of a Bluetooth Ad Hoc Network for Indoor Positioning, IEE Proc.-Softw., vol. 152, No. 5, Oct. 2005, http://ieeexplore.ieee.org/xpl/freeabs_all.jsp?tp=&arnumber=1512737&isnumber=32394, 6 pages.

Alex Varshavsky, et al., Calibree: Calibration-Free Localization using Relative Distance Estimations http://research.microsoft.com/users/jckrumm/Publications%202008/calibree.pdf, 17 pages.

Mike Hazas, et al, A Relative Positioning System for Co-located Mobile Devices http://www.teco.edu/~krohn/ultrasound.pdf, 14 pages.

Futoshi Naya, et al., Bluetooth-based Indoor Proximity Sensing for Nursing Context Awareness, Proceedings of the 2005 Ninth IEEE International Symposium on Wearable Computers (ISWC'05), http://ieeexplore.ieee.org/xpl/freeabs_all.jsp?tp=&arnumber=1550816&isnumber=33046, Downloaded on Oct. 16, 2008 at 02:55 from IEEE Xplore., 2 Pages.

Marie Thilliez and Thierry Delot, A Localization Service for Mobile Users in Peer-to-Peer Environments, F. Crestani et al. (Eds.): Mobile and Ubiquitous Info. Access Ws 2003, LNCS 2954, pp. 271-282, 2004. © Springer-Verlag Berlin Heidelberg 2004, http://www.springerlink.com/content/wech5ex39nrcyj6b/, 12 pages.

Yi Shang and Wheeler Ruml, Improved MDS-based Localization (2004), IEEE INFOCOM 2004, http://citeseerx.ist.psu.edu/viewdoc/summary?doi=10.1.1.58.6077, 12 pages.

Aarabi, "Self-localizing dynamic microphone arrays," Proceedings: IEEE Transactions on Systems, Man, and Cybernetics—Part C: Applications and Reviews, vol. 32, No. 4, Published Nov. 2002, retrieved at <<http://ieeexplore.ieee.org/stamp/stamp.jsp?tp=&arnumber=1176896>>, pp. 474-485.

Ajdler et al., "Acoustic source localization in distributed sensor networks," Proceedings: Signals, Systems and Computers, vol. 2., 2004, retrieved at <<http://ieeexplore.ieee.org/stamp/stamp.jsp?tp=&arnumber=1399368>>, pp. 1328-1332.

Aytekin et al., "The bat headrelated transfer function reveals binaural cues for sound localization in azimuth and elevation," J Acoust Soc Am, Dec. 2004, retrieved at <<http://www.bsos.umd.edu/psyc/batlab/publication/The%20head-related%20transfer%20funcion%20reveals%20binaural%20cues.pdf>>, 2004, pp. 3594-3605.

Bechler et al., "System for robust 3D speaker tracking using microphone array measurements," Proceedings: IROS 2004, Intelligent Robots and System, Sep. 28-Oct. 2, 2004, retrieved at <<http://ieeexplore.ieee.org/stamp/stamp.jsp?tp=&arnumber=1389722>>, pp. 2117-2122.

Begault et al., "3-D Sound for Virtual Reality and Multimedia," Academic Press Professional, Inc., San Diego, CA, USA, 1994, retrieved at <<http://www.macs.hw.ac.uk/modules/F24VS2/Resources/Begault_2000_3d_Sound_Multimedia.pdf>>, 246 pages.

Bian et al., "Using Sound Source Localization in a Home Environment," In Pervasive, 2005, retrieved at <<http://www.sps.ele.tue.nl/members/O.Amft/teaching/UCAR/Bian2005-P_Pervasive.pdf>>, pp. 19-36.

Chen et al., "A Spatial Feature Extraction and Regularization Model for Virtual Auditory Display," In ICASSP '93, 1993, retrieved at <<http://ieeexplore.ieee.org/stamp/stamp.jsp?arnumber=00319072>>, pp. I-129-I-132.

Cheng et al., "Introduction to Head-related Transfer Functions (HRTFs): Representations of HRTFs in Time, Frequency, and Space," In Audio Engineering Society Convention 107, Sep. 1999, retrieved at <<http://505606.pbworks.com/f/HRTF.pdf>>, pp. 231-249.

Girod et al., "A Self-Calibrating Distributed Acoustic Sensing Platform," In SenSys, Nov. 1-3, 2006, retrieved at <<http://www.vladtrifa.com/research/files/Girod06b.pdf>>, 2 pages.

Harter et al., "The Anatomy of a Context-aware Application," Wireless Networks, 2002, retrieved at <<http://www.cl.cam.ac.uk/research/dtg/lce-pub/public/files/tr.2002.2.pdf>>, 15 pages.

Klee et al., "Kalman filters for time delay of arrival-based source localization," Proceedings: EURASIP Journal on Applied Signal Processing, Published Date: Jan. 1, 2006, retrieved at <<http://downloads.hindawi.com/journals/asp/2006/012378.pdf>>, 16 page.

LaMarca, "Location Systems: An Introductiion to the Technology Behind Location Awareness," Synthesis Lectures on Mobile and Pervasive Computing, Copyright 2008 by Morgan & Claypool, 124 pages.

Lopes et al., "Localization of off-the-shelf Mobile Devices using Audible Sound: Architectures, Protocols and Performance Assessment," Mob. Comput. Commun. Rev., 2006, retrieved at <<http://luci.ics.uci.edu/predeployment/websiteContent/weAreLuci/biographies/faculty/djp3/LocalCopy/p38-lopez(2).pdf>>, pp. 38-50.

Morse et al., "Theoretical Acoustics," Princeton University Press, 1968, pp. 1-927.

Parisi et al., "Source Localization in Reverberant Environments by Consistent Peak Selection," Proceedings: Acoustics, Speech and Signal Processing, 2007, ICASSP 2007, retrieved at <<http://ieeexplore.ieee.org/stamp/stamp.jsp?tp=&arnumber=4217010>>, pp. I-37-I-40.

Peng et al., "BeepBeep: A High Accuracy Acoustic Ranging System using COTS Mobile Devices," In SenSys '07, Nov. 6-9, 2007, Sydney, Australia, retrieved at <<http://citeseerx.ist.psu.edu/viewdoc/download?doi=10.1.1.126.1683&rep=rep1&type=pdf>>, 14 pages.

Priyantha et al., "The Cricket Location-support System," In MOBICOM '00, Aug. 2000, retrieve at <<http://nms.lcs.mit.edu/papers/cricket.pdf>>, 12 pages.

Scott et al., "Audio Location: Accurate Low-cost Location Sensing," In Pervasive, 2005, retrieved at <<http://citeseerx.ist.psu.edu/viewdoc/download?doi=10.1.1.91.1061&rep=rep1&type=pdf>>, 18 pages.

Tashev et al., "Microphone Array Post-processor using Instantaneous Direction of Arrival," In IWAENC '06, 2006, retrieved at <<http://research.microsoft.com/pubs/76778/Tashev_IWAENC_2006_Spatial_Filter.pdf>>, 4 pages.

Wenzel et al., "Localization using Non individualized Head-related Transfer Functions," The Journal of the Acoustical Society of America, 94(1):111-123, Jul. 1993, retrieved at <<http://staffwww.itn.liu.se/~karlu/courses/TNM086/papers/wenzel_1993_Localization_Head_Related.pdf>>, pp. 111-123.

Non-Final Office Action for U.S. Appl. No. 13/279,137, mailed on May 7, 2012, Jian Qiu et al., "Device-To-Device Relative Localization", 18 pages.

Office action for U.S. Appl. No. 13/279,137, mailed on Oct. 10, 2013, Chu, et al., "Device-To-Device Relative Localization", 23 pages.

\* cited by examiner

PEER AND COMPOSITE LOCALIZATION FOR MOBILE APPLICATIONS

CROSS REFERENCE TO RELATED APPLICATIONS

This application claims priority to U.S. Provisional Patent Application Ser. No. 61/108,752, filed on Oct. 27, 2008, entitled "PEER AND COMPOSITE LOCALIZATION FOR MOBILE APPLICATIONS", the entirety of which is incorporated herein by reference.

BACKGROUND OF THE INVENTION

The prevalence of mobile devices, such as cell phones, smart phones, laptops, handheld communication devices, handheld computing devices, satellite radios, global positioning systems, PDAs, and so forth has increased dramatically over the past few years. Simultaneously, the world has also witnessed an explosion in peer-to-peer networking for everything from data transmission to social networking.

The commoditization of hardware capabilities on cellular phones, especially general purpose computing platforms and global positioning systems (GPS), has fueled the growth of mobile social applications. However, the social applications are inherently limited by their reliance on current localization techniques.

Current localization techniques, such as GPS, perform poorly indoors and/or can present a significant strain on mobile device resources, including computing ability and power consumption. In typical indoor environments, the density of cellular phones with wireless interfaces that allow peer-to-peer communication (Wi-Fi and/or Bluetooth) is extremely high, and based on the success of Internet based peer-to-peer networking it is reasonable to assume a large number of users would take advantage of mobile social applications while indoors (e.g., home, office, school, etc.).

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

In a first embodiment, a peer based localization system using radio technology, such as Bluetooth or Wi-Fi ad-hoc technology, enables mobile devices such as cell phones, smart phones, laptops, handheld communication devices, handheld computing devices, satellite radios, global positioning systems, PDAs, etc. to discover their physical location relative to one another. In addition, the peer based localization can use a plurality of radio technologies to increase the accuracy of the physical location estimates.

In another embodiment, the peer based localization technique can be combined with infrastructure based location techniques, such as triangulation, GPS, or infrastructure based Wi-Fi localization in order to transpose virtual coordinates into physical coordinates.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

BRIEF DESCRIPTION OF THE ATTACHMENTS

DETAILED DESCRIPTION OF THE INVENTION

Figure 1:
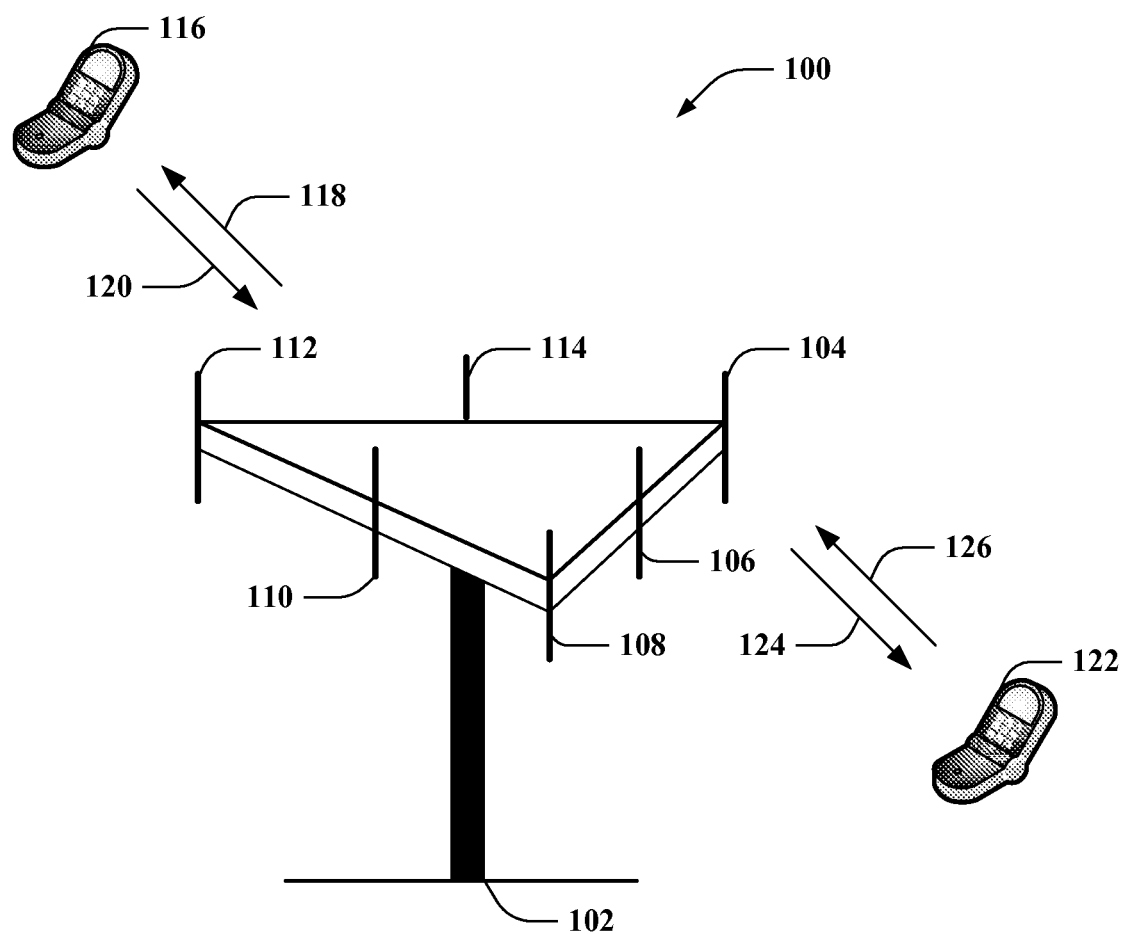
FIG. 1 illustrates an example multiple access wireless communication system in accordance with an aspect of the subject specification.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component," "system," "object," "model," "policy," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Furthermore, inference can be based upon logical models or rules, whereby relationships between components or data are determined by an analysis of the data and drawing conclusions therefrom. For instance, by observing that one user interacts with a subset of other users over a network, it may be determined or inferred that this subset of users belongs to a desired social network of interest for the one user as opposed to a plurality of other users who are never or rarely interacted with.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beam-forming to improve signal-to-noise ratio of forward links 118 and 124 for mobile devices 116 and 122. This can be provided by using a precoder to steer signals in desired directions, for example. Also, while base station 102 utilizes beam-forming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology in one example.

According to an example, system 100 can be a multiple-input multiple-output (MIMO) communication system. Further, system 100 can utilize substantially any type of duplexing technique to divide communication channels (e.g., forward link, reverse link, etc.) such as FDD, TDD, and the like. Moreover, the system 100 can be a multiple-bearer system. A bearer can be an information path of defined capacity, delay, bit error rate, etc. Mobile devices 116 and 122 can each serve one or more radio bearers. The mobile devices 116 and 122 can employ uplink rate control mechanisms to manage and/or share uplink resources across the one or more radio bearers. In one example, the mobile devices 116 and 122 can utilize token bucket mechanisms to serve the radio bearers and to enforce uplink rate limitations.

Pursuant to an illustration, each bearer can have an associated prioritized bit rate (PBR), maximum bit rate (MBR) and guaranteed bit rate (GBR). The mobile devices 116 and 122 can serve the radio bearers based, at least in part, on the associated bit rate values. The bit rate values can also be employed to calculate queue sizes that account for PBR and MBR for each bearer. The queue sizes can be included in uplink resource requests transmitted by the mobile devices 116 and 122 to the base station 102. The base station 102 can schedule uplink resources for mobile device 116 and 122 based upon respective uplink requests and included queue sizes.

Figure 2:
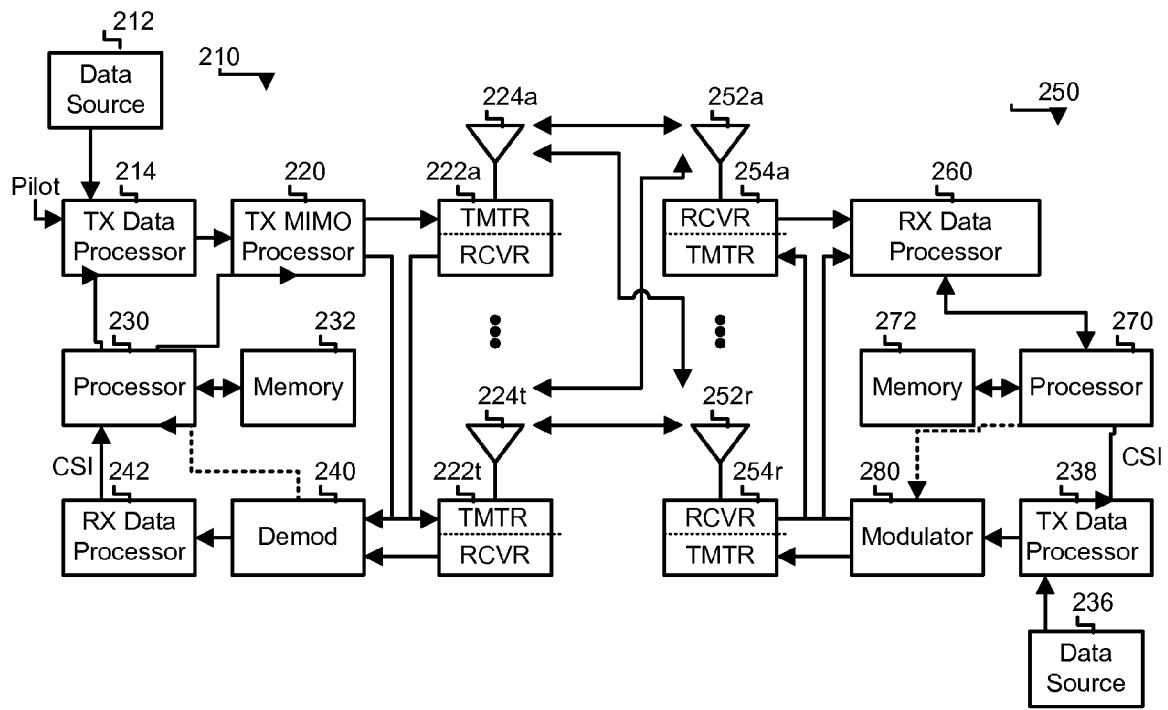
FIG. 2 illustrates a general block diagram of a communication system in accordance with an aspect of the subject specification.

FIG. 2 is a block diagram of a transmitter system 210 (also known as the access point) and a receiver system 250 (also known as access terminal) in a MIMO system 200. At the transmitter system 210, traffic data for a number of data streams is provided from a data source 212 to a transmitter (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beam-forming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beam-forming weights then processes the extracted message.

Figure 3:
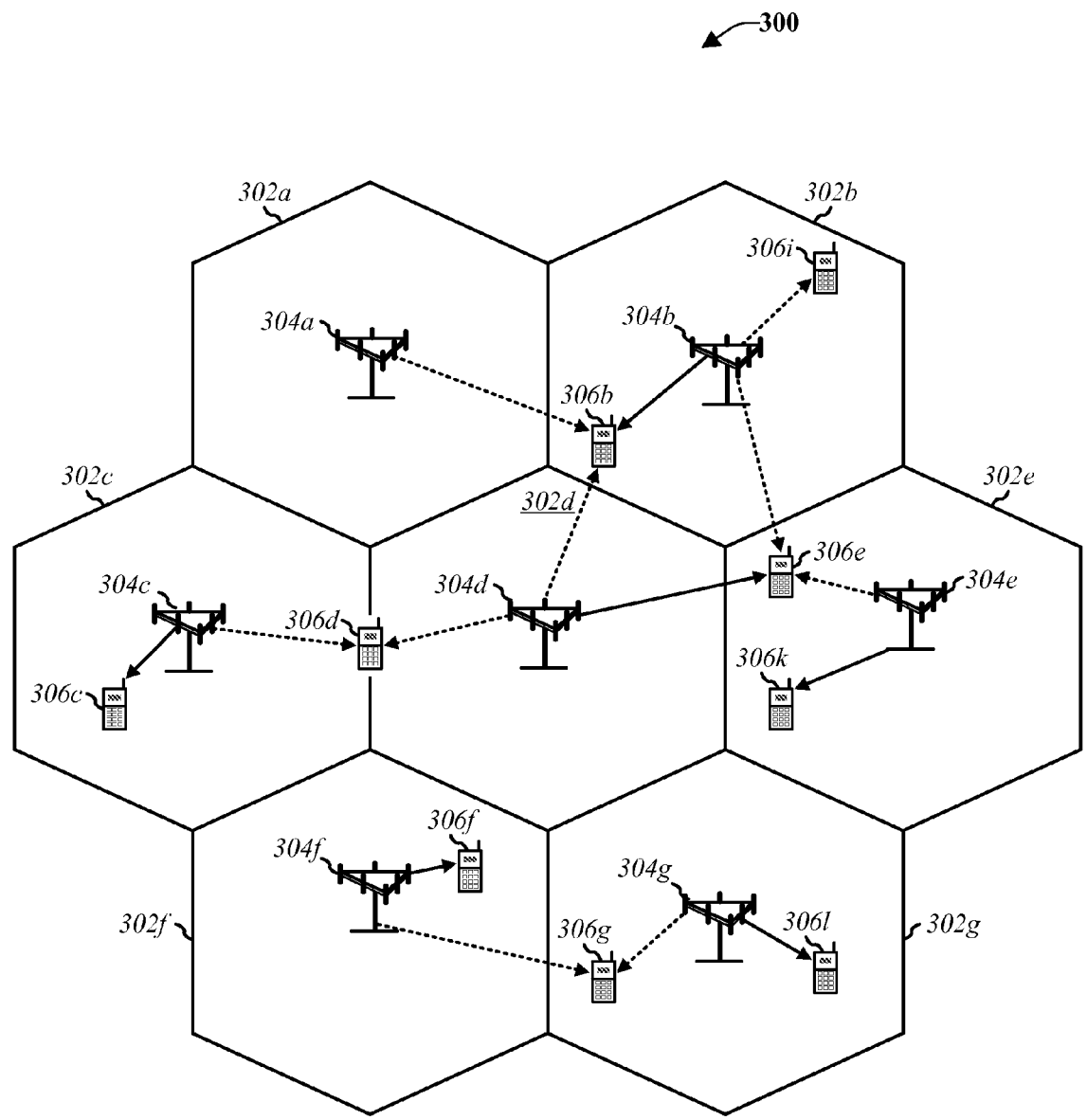
FIG. 3 illustrates an example wireless communication system operative to execute one or more embodiments disclosed in the subject specification.

FIG. 3 illustrates an exemplary wireless communication system 300 configured to support a number of users, in which various disclosed embodiments and aspects may be implemented. As shown in FIG. 3, by way of example, system 300 provides communication for multiple cells 302, such as, for example, macro cells 302a-302g, with each cell being serviced by a corresponding access point (AP) 304 (such as APs 304a-304g). Each cell may be further divided into one or more sectors (e.g. to serve one or more frequencies). Various access terminals (ATs) 306, including ATs 306a-306k, also known interchangeably as user equipment (UE) or mobile stations, are dispersed throughout the system. Each AT 306 may communicate with one or more APs 304 on a forward link (FL) and/or a reverse link (RL) at a given moment, depending upon whether the AT is active and whether it is in soft handoff, for example. The wireless communication system 300 may provide service over a large geographic region, for example, macro cells 302a-302g may cover a few blocks in a neighborhood.

Typically, through a technique commonly known as triangulation the UEs 306 can discover their physical location based on the known locations of the APs 304 (e.g. cell towers). Unfortunately, triangulation often does not provide accurate localization. Additionally or alternatively, the physical location of a UE 306 can be determined using Wi-Fi infrastructure based localization, such as a Dense Array of Inexpensive Radios (DAIR), an In-Building RF-based User Location and Tracking System (e.g. RADAR), Place Lab, and so forth. Wi-Fi infrastructure based localization relies on a dense deployment of Wi-Fi hotspots and a manual site survey to profile the environment. A few drawbacks of Wi-Fi infrastructure based localization include a lack of dense deployments of Wi-Fi hotspots, and/or a lack of sufficient detailed site surveys. Modern UEs 306 can also determine their physical location, in terms of longitude and latitude, through the use of a global positions satellite (GPS) system. However, GPS typically does not function well indoors, and can require a lot of power from the UEs 306.

Figure 4:
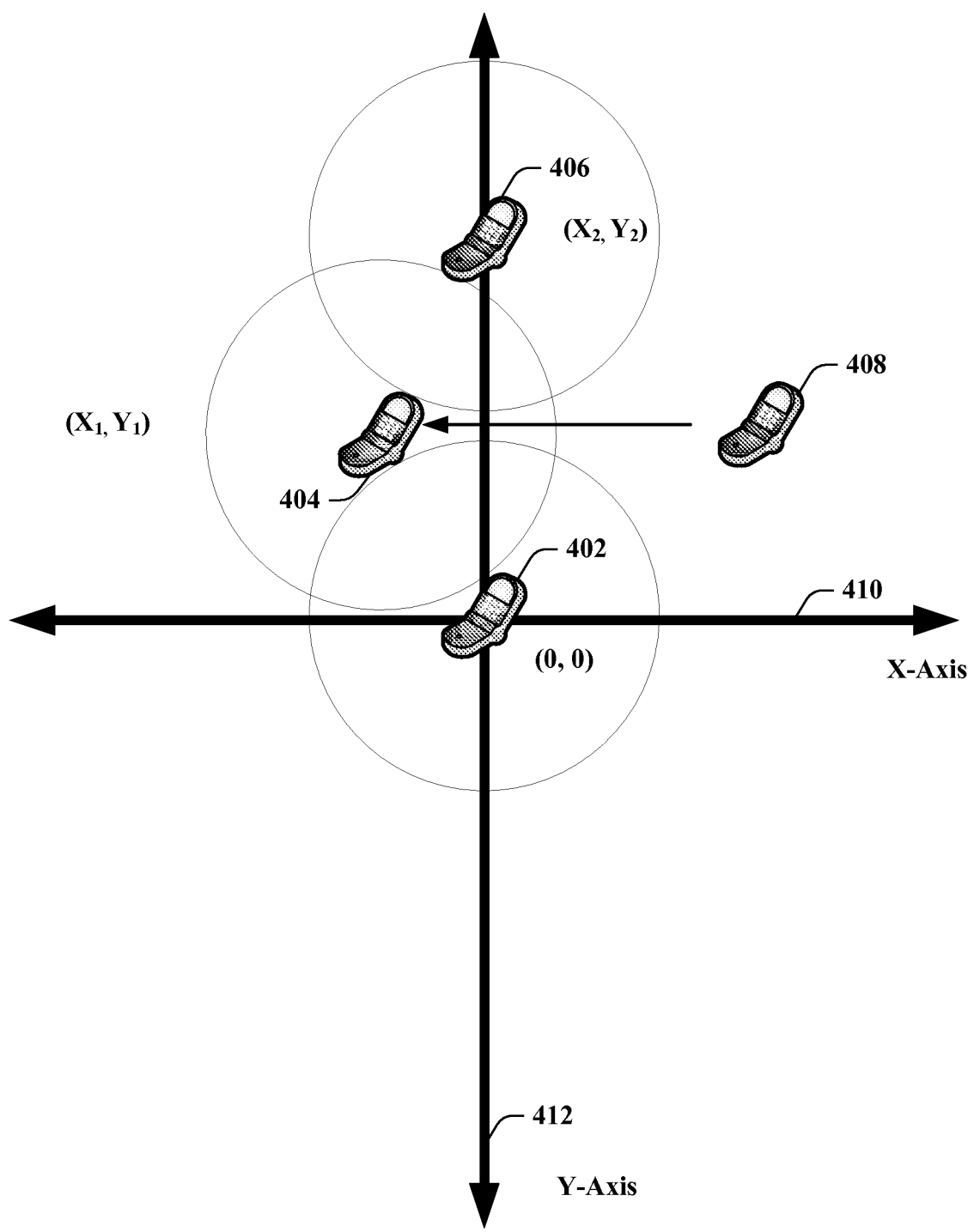
FIG. 4 illustrates an example wireless communication system in accordance with an aspect of the subject specification.

FIG. 4 is an example illustration of peer and composite localization in a wireless communication system in accordance with an aspect of the current innovation. The system 400 includes a first mobile device 402, a second mobile device 404, a third mobile device 406, and a fourth mobile device 408. For simplicity of explanation, the mobile devices are illustrated as residing on a two-dimensional plot consisting of an X-Axis 410 and a Y-Axis 412. However, it is to be appreciated that this is but a single example, and the techniques described herein can be used with most any number of mobile devices operating in three dimensions. Furthermore, the plot could be illustrative of a cell, a city map, a building layout, and so forth.

The mobile devices can include but are not limited to cell phones, smart phones, laptops, handheld communication devices, handheld computing devices, satellite radios, global positioning systems, PDAs, and so forth. The first mobile device 402 is located at the origin (e.g., {0,0}) of the plot. Assuming that the mobile devices' radio range can be expressed as a circle, the first mobile device's 402 radio range could be represented by the equation:

$$X^2+Y^2=r^2$$

where X is the distance along the X axis 410, Y is the distance along the Y axis 412, and r is the radius of the radio range (range) of the first mobile device 402. For instance, the mobile device 402 can detect, sense, or otherwise communicate with one or more radio enabled (e.g., Bluetooth, Wi-Fi, etc.) devices within the mobile device's 402 range, r. As illustrated, the range of the first mobile device 402 and the second mobile device's range 404 overlap. Consequently, the first mobile device 402 and second mobile device 404 can determine their physical distance relative to one another based on the radio communication (e.g., peer-to-peer communication).

Peer-to-peer (P2P) communication can enable the mobile devices to communicate independent of a wireless communication infrastructure (discussed supra). For example, the mobile device 402 can estimate the physical distance to the mobile device 404 based on one or more properties of the P2P communication, such as a received signal strength indicator (RSSI). Moreover, as illustrated the mobile device 404 and the mobile device 406 can determine their relative physical location via P2P communication, and the first mobile device 402 can determine the distance to the third mobile device 406 based on the distance determined between the second and third mobile devices 404 and 406.

For example, the second mobile device 404 and the third mobile device 406 can determine their respective physical locations relative to one another, and the first mobile device 402 and the second mobile device 404 can also determine their respective physical locations relative to one another using P2P communication. Subsequently, the first mobile device 402 and the third mobile device 406 are not in range of one another, but can determine their relative physical locations based on each mobile devices' 402 and 406 physical location relative to the second mobile device 404. In addition, the fourth mobile device 408 can determine its physical location relative to other mobile devices 402, 404, and 406 based on its location relative to one or more of the mobile devices 402, 404, and 406. For instance, the fourth mobile device 408 is illustrated as not being in the P2P range of either mobile device 402, 404, or 406. However, the mobile device 408 can connect to a mobile device (e.g., the second mobile device 404) via the wireless communication infrastructure, and can determine its physical location relative to the other mobile devices 404, 406, and 408 based on their determined location to one another (discussed supra).

Additionally, the mobile devices 402 can employ one or more additional positioning techniques (e.g., GPS) to translate their physical locations (e.g., distance apart) to an actual location, such as streets, blocks, etc. It is to be appreciated that the example is illustrated for brevity and clarity of explanation; however a plurality of possible arrangements are possible within the scope and spirit of the subject innovation.

Figure 5:
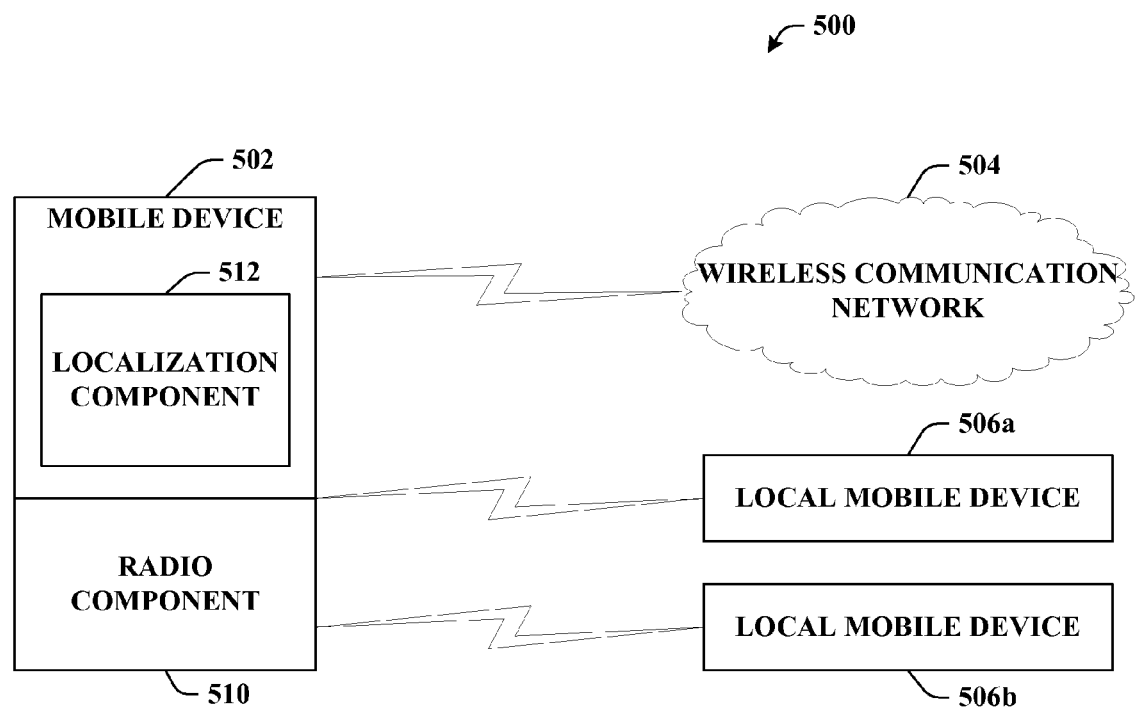
FIG. 5 illustrates an example general component block diagram of a mobile device in accordance with an aspect of the subject specification.

FIG. 5 illustrates an example general component block diagram of mobile device localization in accordance with an aspect of the present innovation. A communication system 500 includes a mobile device 502, a wireless communication network 504, and a set of local mobile devices 506 (e.g. 506a and 506b). As previously discussed, the mobile device 502 can communicate with the wireless communication network 504 via the communication link 508. The wireless communication network 504 can be a system as described in FIGS. 1-3.

The mobile device 502 includes a radio component 510, and a localization component 512. The radio component 510 can include virtually any radio technology that enables the mobile device 502 to engage in peer-to-peer (P2P) communication with local mobile devices 506, including but not limited to Wi-Fi, Bluetooth, and so forth. For example, the mobile device 502 could be located in an enclosed space, such as a mall, an office, a nightclub, etc., and the radio component 510 allows the mobile device to communicate with the local mobile devices 506 independent of the wireless communication network 504. It is to be appreciated that the radio component 510 can enable the mobile device to communicate with virtually any radio enabled mobile device within the radio component's 510 transmission and reception range. For example, the effective range of Bluetooth devices is typically about 32 feet or 10 meters. As a consequence, if the radio component 510 includes Bluetooth technology, then the local mobile devices 506 would include substantially all similarly enabled mobile devices within approximately 32 feet.

The localization component 512 can use the P2P communication established via the radio component 510, and in cooperation with the local mobile devices 506 estimate the physical distance between the mobile device 502 and the local mobile devices 506. For example, the mobile device 502 can be located in an office. The mobile device's 502 GPS may not be functional inside of the office; however the radio component 510 can establish P2P communication with local mobile device 506a when it enters the office. In addition, the localization component 512 can cooperatively determine the distance between the mobile device 502 and the local mobile device 506a. For example, the mobile device 502 can estimate the distance based on a received signal strength indication (RSSI) of the P2P radio communications, and comparing that to an estimate of how RSSI for the particular radio technology decreases with distance.

Additionally or alternatively, the radio component 510 can include multiple radios. For example, the radio component 510 can include a Bluetooth radio, and a Wi-Fi system. In this embodiment, the localization component 512 can use both radios simultaneously to improve the accuracy of the distance estimations. Moreover, the system 500 can allow beacon-stuffing for multi-hop peer-localization. For example, local mobile device 506a can be located in between local mobile device 506b and mobile device 502. The beacon signal of local mobile device 506a can include (e.g. can be stuffed with) data regarding the position of local mobile 506b. Therefore, even if mobile device 502 is not within range of local mobile 506b it can still estimate their relative distance via multi-hop peer localization.

It is to be appreciated that an additional aspect of the system 500 is that having multiple devices can improve localization. For example, if mobile device 502 hears local mobile device 506a and local mobile device 506b, then mobile device 502 can independently estimate the distance to each 506a and 506b. The mobile device 502 can also base the distance estimates on the distances that local mobile 506a and local mobile 506c estimate between themselves in order to improve the accuracy of estimation.

Additionally or alternatively, the process of scanning for other mobile devices on Bluetooth and/or Wi-Fi and estimating the distance to each of them can take a long time, and can consume large quantities of energy and/or network resources. Depending on the type of mobile device, it can potentially also consume limited computation resources. If there is a mobile device, such as a laptop in the vicinity that is compatible with and running the previously mentioned localization system, it can take over one or more of the tasks to reduce the burden on another mobile device. For example, a laptop can scan the Bluetooth and Wi-Fi neighborhoods more aggressively than a cell phone because it will not have a huge impact on the laptop's battery and system load. When the laptop detects movement of cell phones or the arrival/departure of a cell phone, it can then signal other cell phones to start scanning. This signaling can be done in a plurality of ways—one way is for cell phones to periodically poll the laptop over Bluetooth or Wi-Fi, or for the cell phones and laptops to share this information via a server on the Internet. The laptop can also coordinate scanning between the different cell phones— it can specify which cell phone will scan next, and on which channel, and even the list of other cell phones it should connect to in order to measure the received signal strength (RSSI) of radio communication to them. This can reduce scanning contention and improve localization speed and reduce energy consumption on the cell phones.

In an additional embodiment, the localization component 512 can combine the peer-localization established via the radio component 510, with one or more infrastructure localization techniques (e.g. GPS, Wi-Fi infrastructure based localization, triangulation, etc.). Consequently, one or more mobile devices 502 could establish their physical location on the globe using the infrastructure based localization techniques, and then using the P2P localization transpose the virtual coordinates into physical coordinates.

Figure 6:
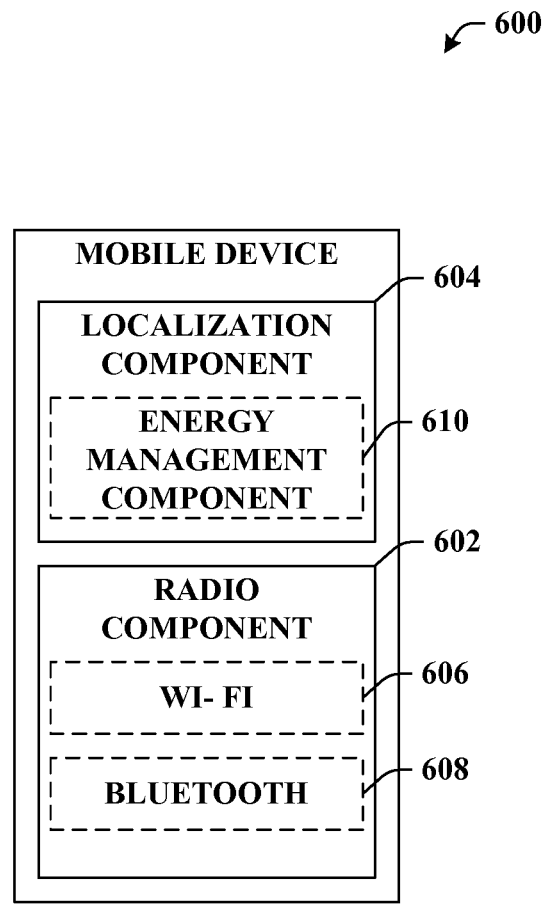
FIG. 6 illustrates an example general component block diagram of a mobile device in accordance with an aspect of the subject specification.

FIG. 6 illustrates an example mobile device in accordance with an embodiment of the present innovation. The mobile device 600 includes a localization component 604 and a radio component 602. As discussed previously, the radio component 602 can include virtually any radio technology that enables the mobile device 602 to engage in peer-to-peer (P2P) communication with other local mobile devices (not shown). In addition, the radio component 602 can include a plurality of radio technologies. For example, the radio component 602 can include a Wi-Fi radio 606, and a Bluetooth radio 608 that the radio component 602 can use to communicate independently or simultaneously. By using multiple radio technologies the radio component 602 can increase the accuracy with which it can determine the location of other mobile devices (discussed infra).

As discussed supra, the localization component 604 can use P2P communication established via the radio component 602, and in cooperation with local mobile devices to estimate the physical distance between the mobile device 600 and the local mobile devices. However, as with any system targeted at mobile devices, energy consumption is a critical concern. The localization component 604 can further include an energy management component 610. The energy management component 610 can implement a plurality of energy saving techniques. For example, the energy management component 610 can implement adaptive Bluetooth scanning to conserve energy expended by the mobile device 600 for localization. Repeated scans are unnecessary in a static environment, such as when no other devices are around, or when none are moving. Consequently, the scan interval can be adjusted based on observations in the surrounding environment in order to reduce power consumption. For example, the energy management component 610 can track changes in its neighbor graph(s) and can accordingly adjust its interval. The energy management component can aggressively scan when one or more neighbor graphs change, or increase the period between scans when there is no change in neighbor graphs.

Between successive scans the energy management component 610 can instruct the Bluetooth radio 608 to remain active. The energy consumption of the Bluetooth radio 608 is relatively small. Consequently, the Bluetooth radio 608 responds to peers' scans and the corresponding neighborhood graph is always complete. In contrast, Wi-Fi radio 606 can consume significant amounts of energy, even in the idle state. For the Wi-Fi radio 606 the energy management component 610 can use an alternative approach. The energy management component 610 can instruct the mobile device 600 to periodically (e.g., every one minute) turn on the Wi-Fi radio 606 and put it in scan mode. The mobile phone 600 and other mobile phones (not shown) can synchronize their clock time with the wireless communication infrastructure (discussed supra).

Additionally or alternatively, the energy management component 610 can employ cloud coordination to conserve the mobile device's 600 energy. Typically, there are significant periods of time when the mobile device 600 will be completely alone. During these periods of time the energy management component 610 can keep the Wi-Fi radio 606 off, and not initiate Bluetooth radio 608 scanning until a new device arrives. Many mobile devices are constantly connected to the internet via a cellular data connection. In order to detect arrival of new device without radio scanning, the mobile devices can upload their approximate geographic location to a service running on the internet. For example, this location can be calculated using low-energy, coarse grained GSM localization. The mobile device 600 can query the web service to find out how many devices are in the vicinity and running peer localization. If there are no peers around the mobile device 600, the energy management component 610 can instruct the radio component 602 to keep the Wi-Fi radio 606 off, and not scan using the Bluetooth radio 608. Otherwise, the energy component 610 can adjust the Bluetooth radio 608 scanning interval and Wi-Fi wake-up interval as discussed previously.

Furthermore, cloud coordination allows the energy management component 610 to further reduce energy consumption based on application behavior (e.g., leverage application behavior). Even though an application that uses peer localization is running, if the user is not interacting with the phone, then scanning can waste energy. Conversely, not scanning, and not participating in multi-hop discovery, could degrade localization accuracy for other devices where their users are actively interacting with a mobile device. Therefore, by determining the periods of time when every mobile device in the vicinity is simultaneously not in use; the energy management component 610 can further reduce energy consumption without sacrificing localization accuracy for the other devices. The energy management component can use one or more interactive mobile device 600 features, such as a screen back-light, to determine when the mobile device is actually in use. For example, when the screen back-light is not on the mobile device 600 the energy management component 610 can assume that the device 600 is not in use. The information can be forwarded to a web service (discussed supra) along with the geographic location. When the mobile device 600 queries the web service to find out how many devices are in the vicinity, it also discovers how many are active (e.g., back-light on). If any device in the vicinity is active, then the mobile device 600 can resume normal discovery behavior. It is to be appreciated that these are but a few examples, and a plurality of implementations are possible within the scope and spirit of the subject innovation.

Figure 7:
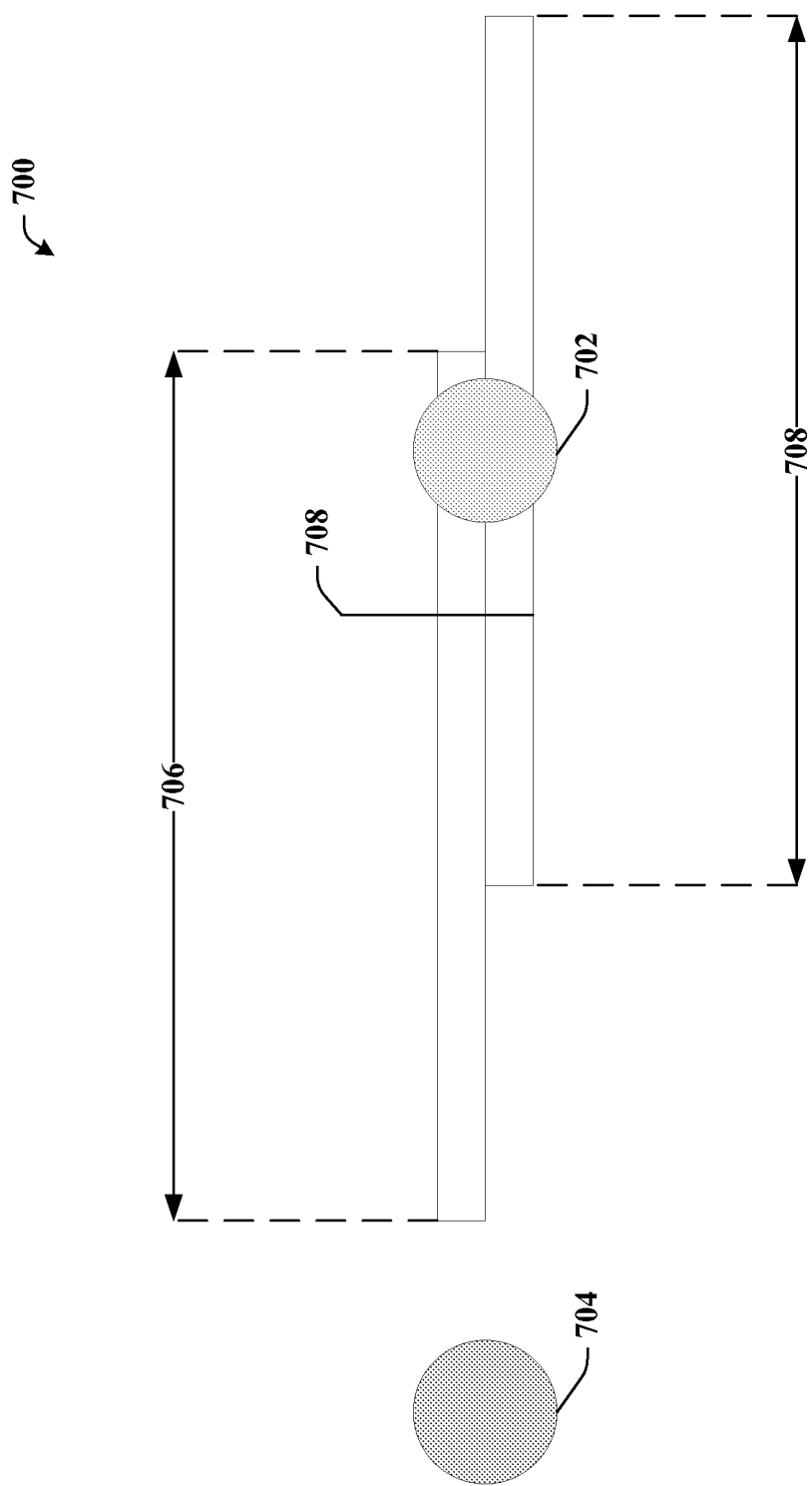
FIG. 7 illustrates an example diagram of multiple radio use to reduce errors in computing distances in accordance with an aspect of the subject specification.

Turning to FIG. 7, an example diagram illustrating the use of multiple radios to reduce errors in computing distance is shown in accordance with one or more embodiments of the present innovation. The diagram 700 illustrates an example of using Received Signal Strength Indication (RSSI) measurements from multiple radios simultaneously to reduce the error in computing distance. The approach works for any radio with an RSSI to distance conversion, or when using three or more radios.

The diagram 700 includes two nodes, a first node 702 and a second node 704. The first node 702 can send, broadcast, or otherwise transmit a message to the second node 704. The messages can be broadcast using a plurality of radio technologies. For example, the first node 702 can broadcast the message via a first radio technology, such as Bluetooth, and a second radio technology, such as Wi-Fi. The first node 702 is shown at an estimated sender position determined based on the error 706 of the first radio technology and the error 708 of the second radio technology. For example, $RSSI_1$ and $RSSI_2$ can be the RSSI of the first and second radio technologies, respectively. A distance estimate, $x_1$ and $x_2$, can be obtained for each radio technology. In addition, an uncertainty, $u_1$ and $u_2$, is obtained for each radio technology, wherein each uncertainty is the distance between the $25^{th}$ and $75^{th}$ quartiles. The midpoint 708 of the two distance estimates can be described using the equation: $P=(x_1+x_2)/2$. A displacement can be applied from P for each measurement, which are $F_1=(P-x_1)*u_1/2$ and $F_2=(P-x_2)*u_2/2$. The final distance estimate can be determined based on the midpoint displaced by a normalized sum of displacements $D=P+2(F_1+F_2)/(u_1+U_2)$. The normalization ensures that the estimated distance always falls within the range of estimates given by the two RSSI readings. Additionally or alternatively, where the uncertainties from the two readings do not intersect, P can be used as the final distance.

The foregoing enables the first node 702 and the second node 704 to estimate the distance between them, while reducing error. These distances are embedded in the messages that are exchanged between them so that ultimately, each node knows the distance between any two nodes that can communicate in the vicinity. It is to be appreciated that this is but one example, and a plurality of techniques may be used for reducing the error using multiple radio technologies.

Figure 8:
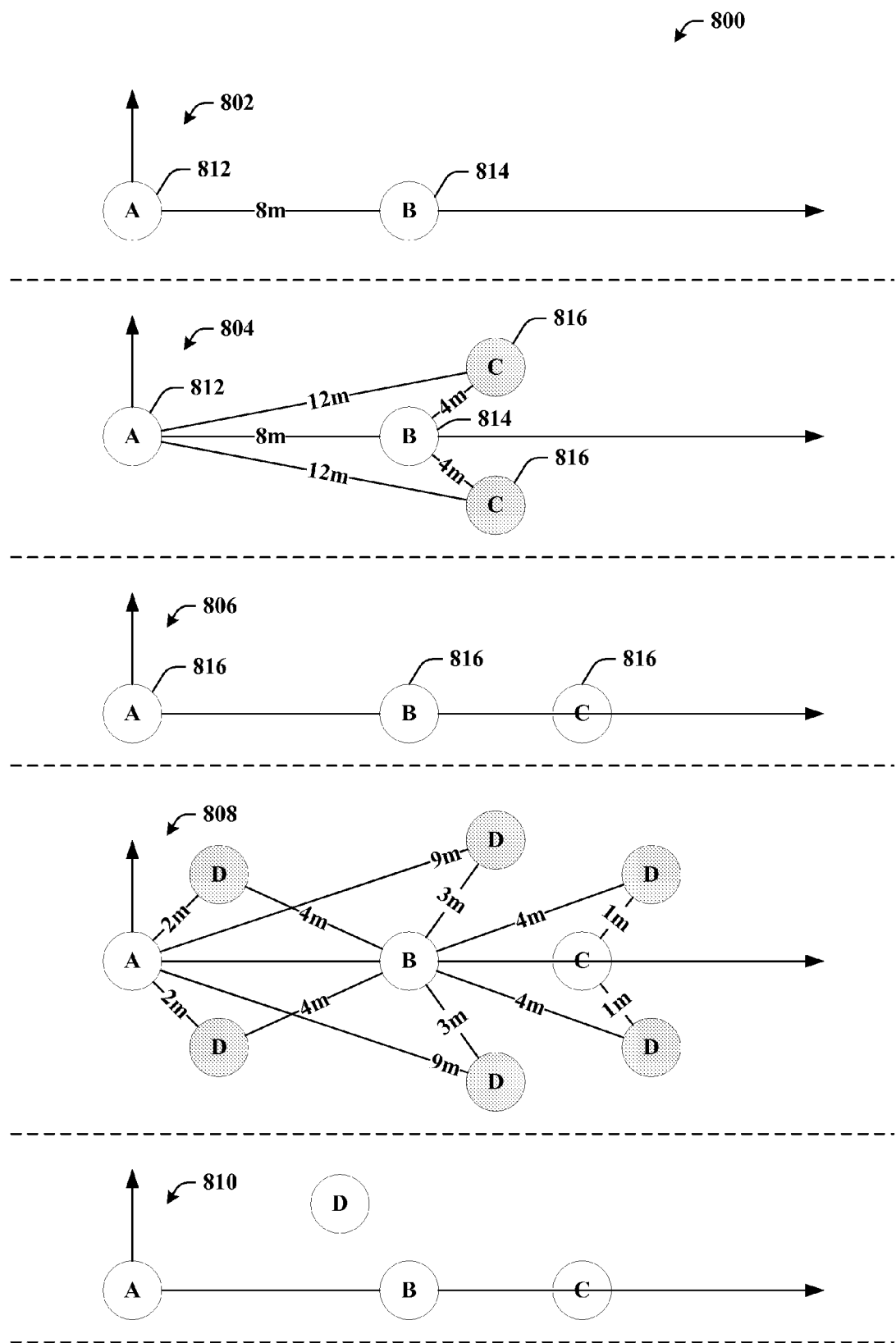
FIG. 8 illustrates an example technique for determining the two-dimensional spatial placement for a set of nodes in accordance with an aspect of the subject specification.

FIG. 8 illustrates an example technique for determining the two-dimensional spatial placement for a set of nodes in accordance with an embodiment of the present innovation. The example technique, as illustrated, is comprised of a plurality of steps 802-810. However, it is to be appreciated that the example is illustrated for simplicity of explanation, and the steps are not required to be performed in the order or manner shown to be within the scope and spirit of the subject innovation.

At 802, a node A 812 (e.g. the first node) places itself at the location (0,0), and then finds a peer, node B 814, that is the shortest distance ($r_1$) away. Node B is placed at the location $(0,r_1)$. It is not necessary for node A to discern the direction, and placement can be arbitrary as long as it is $r_1$ from the origin. At 804, another node, Node C 816, is chosen from the set of peers, such that the node is constrained by both node A 810 and node B 812. At 806, in placing node C 816 there are two solutions since the constraints are quadratic, and in order to minimize error the algorithm takes an average of these two positions and places node C 816 at that point. At 808, another node is selected, node D 818, that is constrained by as many of the currently placed nodes (e.g., node A 812, node B 814, and node C 816) as possible. In the example illustrated, node D 818 is constrained by all three nodes (e.g., node A 812, node B 814, and node C 816), and each of these pairs of constraints yields four possible solutions. The set of locations that are closest together are selected from each pair of possible locations, and minimizes the selected locations in order to place D at 810. The process described can also be expressed by the spatial placement algorithm for calculating two-dimensional coordinates for peers, shown below:

---
Algorithm 1
---
Input: Set of constraints $C = \{C_1, \ldots, Cn\}$
 $\{r_1$ = pairwise node distance$\}$
 Constraint $C_i$ of form $(x - x_i)^2 + (y - y_i)^2 = r_i^2$
 {solve constraint one pair at a time}
 loop
  For every pair of constraints $(C_i, C_j)$
  Find intersection points $(x_i, y_i)$ and $(x_2, y_2)$
 end loop
 {Output from previous stage}
 P: set of coordinate pairs from constraint intersection
 $P = \{\{(x_1^1, y_1^1), (x_2^1, y_2^1)\}, \ldots, \{(x_1^k, y_1^k), (x_2^k, y_2^k)\}\}$
 {initialize solutions set with coordinate of parent node
 Intersection set $S = \{(0, 0)\}$
 loop ---
Algorithm 1 -continued
---
 For each element $E = \{(x_i^j, y_j^1), (x_2^j, y_2^j)\} \square P$
  {Find intersection point which has minimum distance with
 point S}
  $S = S \cup \arg\min \Sigma_{(x_i, y_j) \in S} \sqrt{((x_i - x_j)^2 + (y_i - y_j)^2)}$
 end loop return Node coordinate $\left(\frac{1}{|S|}\sum_{x_i \in S} x_v \frac{1}{|S|}\sum_{y_i \in S} y_i\right)$ Additionally or alternatively, the spatial placement algorithm may be unable to find a node that is constrained by two or more nodes. The node may lie anywhere on a circle surrounding its sole peer. The algorithm can place the node at a random position on the circle and continues with the remaining nodes. The under-constrained placements can incur the largest error using the algorithm. However, in order to solve the problem, after the algorithm completes and places all of the nodes, the algorithm can be run again starting with the node placements from the first run. The algorithm can attempt to move nodes so as to satisfy more constraints and can re-run until no significant improvements are made.

Figure 9:
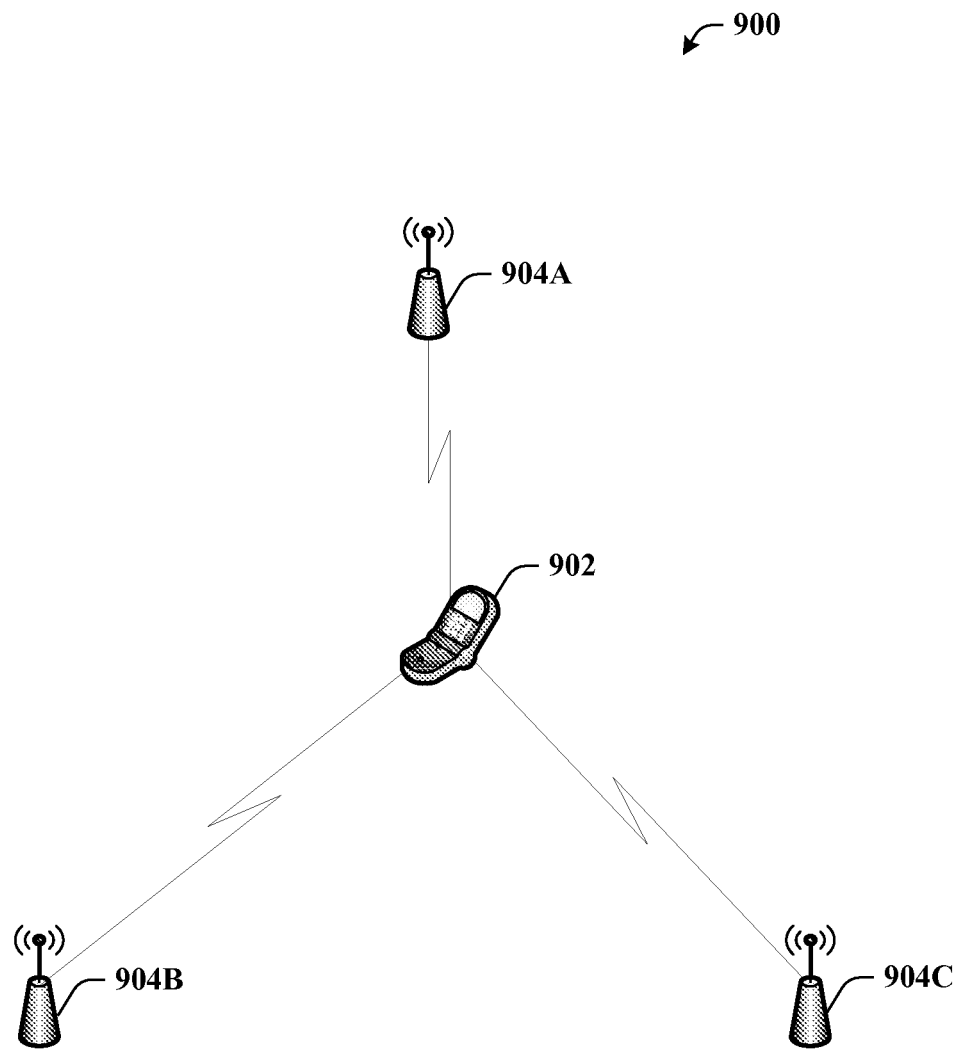
FIG. 9 illustrates an example block diagram of a localization system in accordance with an aspect of the subject specification.

Referring now to FIG. 9, an example block diagram of a localization system is illustrated in accordance with an aspect of the current innovation. The system 900 includes a mobile device 902 and plurality of access points 904 (e.g., 904A-C). The mobile device 902 is illustrated as a cell phone for simplicity of explanation; however it is to be appreciated that the mobile device 902 can include cell phones, smart phones, laptops, handheld communication devices, handheld computing devices, satellite radios, global positioning systems, PDAs, and so forth.

Typical wireless communication standards (e.g., IEEE 802.11) can require a mobile device 902 to associate with an access point (AP) 904 before it can communicate. Once the mobile device 902 is associated with the AP 904 it can no longer communicate with other APs, despite being able to hear APs other than the AP with which it is associated. For example, if the mobile device 902 associates with AP 904A, then the mobile device 902 cannot communicate with 904B and/or 904C. This can needlessly limit the communication capability of a wireless network.

Beacon signals (e.g., beacon frames) announce the presence of a wireless network (e.g., Wi-Fi), and the AP 902 can periodically scan for beacon signals. The mobile device 902 receives one or more beacon signals from APs 904 even when they are not connected to an AP 904 or connected to another AP 904. Continuing with the previous example, if the mobile device 902 is associated with the AP 904A, the mobile device 902 will continue to receive beacon signals from AP 904B and AP904C. By overloading the fields in the beacon signal (e.g., beacon-stuffing) and/or other management frames, the APs 904 can communicate with non-associated mobile devices 902. For instance, AP 904B and/or 904C can embed content in beacon and response frames, while the mobile device 902 can overload probe request to send data.

Typically, beacon frames have a range of 100-200 meters, and are thus are implicitly localized. For example, if the mobile device 902 is located in a restaurant it will only receive beacon signals transmitted from APs 904 in the physical vicinity of the restaurant. As a result, the mobile device 902 can be implicitly located. In addition, the range of the beacon signals can be varied by manipulating one or more aspects of the beacon signal, such as the transmit power, encoding scheme, and so forth. For instance, an amusement park could manipulate the beacons signals of their wireless network, such that only patrons inside the park receive the beacon frames. The mobile devices 902 can determine they are inside the amusement park, and determine the physical distance between other mobile devices inside the amusement park (discussed supra).

The P2P localization can be used in conjunction with data obtained via one or more stuffed beacons to determine physical location of a mobile device 902 relative to other mobile devices in the context of an actual location. For example, the mobile device 902 can be located in a mall and determine the physical distance to other mobile devices via P2P localization. In addition, the mobile devices can implicitly determine their location inside the mall based on beacon signals received from retail stores containing additional location information.

Figure 10:
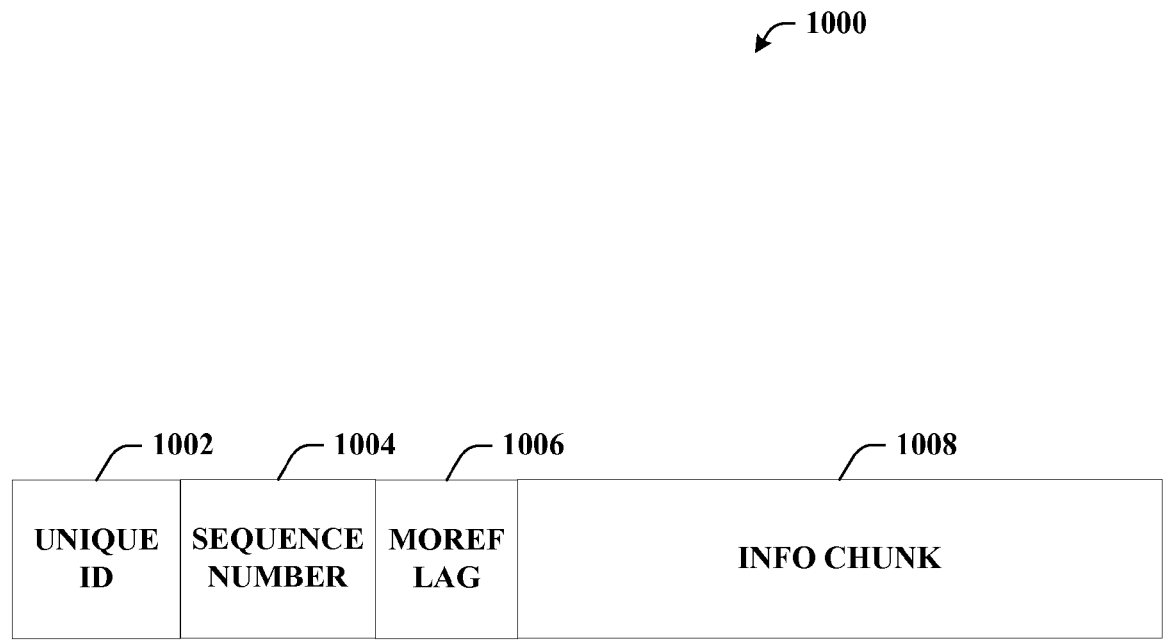
FIG. 10 illustrates an example beacon frame in accordance with an aspect of the current innovation.

FIG. 10 illustrates an example beacon frame in accordance with an aspect of the current innovation. The beacon frame 1000 includes a unique id 1002, a sequence number 1004, a moref lag field 1006, and an info chunk 1008. The unique id 1002 identifies the message being broadcast. For example, the unique id 1002 can include a network specified identification number, wherein each frame of the message being broadcast carries the unique id 1002. The sequence number 1004 is a fragment number, and the moref lag field 1006 indicates to the receiving device if it should expect more fragments. For example, the moref lag field 1006 can contain a value of one or zero, wherein a one indicates that more fragments should be expected and a zero indicates that more fragments should not be expected. The Info Chunk 1008 contains the contents of the message. Upon receipt of all fragments the receiving device (e.g., mobile device, user equipment, etc.) can reassemble the message fragments.

In one embodiment, beacon-stuffing can be accomplished via service set identification (SSID) modification. Typically, commercial access points allow users to modify the SSID with little difficulty. Beacon-stuffing can also be accomplished via basic service set identifier (BSSID) modification and/or adding one or more extra Information Elements to the beacon. Modifying the BSSID and/or adding extra Information Elements to the beacon require access to the source code running on the AP, but neither requires any modifications to the hardware or firmware of the client devices (e.g., mobile devices, user equipment, etc.). For the SSID and BSSID based techniques, a simple user-level application is sufficient to reassemble the fragmented messages. The third technique, which uses one or more extra Information Elements, requires changes to the wireless (e.g., Wi-Fi) driver on the client devices.

Currently, end-users make decisions about which wireless network to connect with based on very limited information. For example, wireless configuration services (e.g., Windows wireless zero-config service) often present a simple list of the available network names along with an approximation of the signal strength of an AP from that network. Using the beacon-stuffing mechanisms described above, the beacons can be overloaded to provide a variety of different information that can be useful to end-users in making their network connection decisions, including but not limited to pricing information, the number of users connected through the AP, additional performance-related network utilization information, when the network is open or closed for public use, and other AP selection criteria.

Additionally or alternatively, the beacon-stuffing can be used to deliver location-sensitive messages (e.g., advertisements, coupons, store information, etc.) to mobile devices. For example, known cryptographic techniques can be used to support coupon distribution. Our approach relies on an Ad Service Provider (ASP) who is responsible for distributing the public and private key-pairs to all the entities involved (e.g., the Wi-Fi clients, the APs, and the stores), and is responsible for online validation during coupon distribution and redemption. The client keys can be encrypted and stored on the user's device when the user installs the client software. For instance, when a user receives a coupon they are interested in, they click a button on a user interface (UI) to capture the coupon. This to triggers the client to send a directed Probe Request to the AP that sent the coupon. The SSID field of the Probe Request frame can contain a plurality of fields, including but not limited to a time-stamp, the user ID, and the client's MAC address, and so forth, wherein each is encrypted with the ASP's public key. The AP signs this packet and forwards it to the ASP server. The ASP server validates the client's request by matching the user ID with the client MAC address and forms a packet that contains the coupon, the time stamp, and the MAC addresses of the client and AP, and encrypts it with the store's public key. This encrypted packet is sent back by the AP in its Probe Response.

When the user tries to redeem the coupon at the store, the store decrypts the coupon packet, and validates the client's MAC address and the coupon. The preceding example can provide protection against various attacks. For example, it prevents an attacker from replaying a request to get the coupon, since the attacker not only has to spoof the MAC ID, it also has to learn about the user's ID to cash-in the coupon, and the user ID is always encrypted before sending on the air. Additionally, in a scenario where a store wants to distribute a limited number of coupons, this scheme limits an attacker from exhausting all the coupons, because the user provides a MAC address and user ID before the coupon is issued. Various other attacks, such as forging coupons, forging user identity, and AP spoofing can also be thwarted. It is to be appreciated that these are but a few examples, and a plurality of beacon frame structures and beacon-stuffing techniques are possible within the scope and spirit of the subject innovation.

Figure 11:
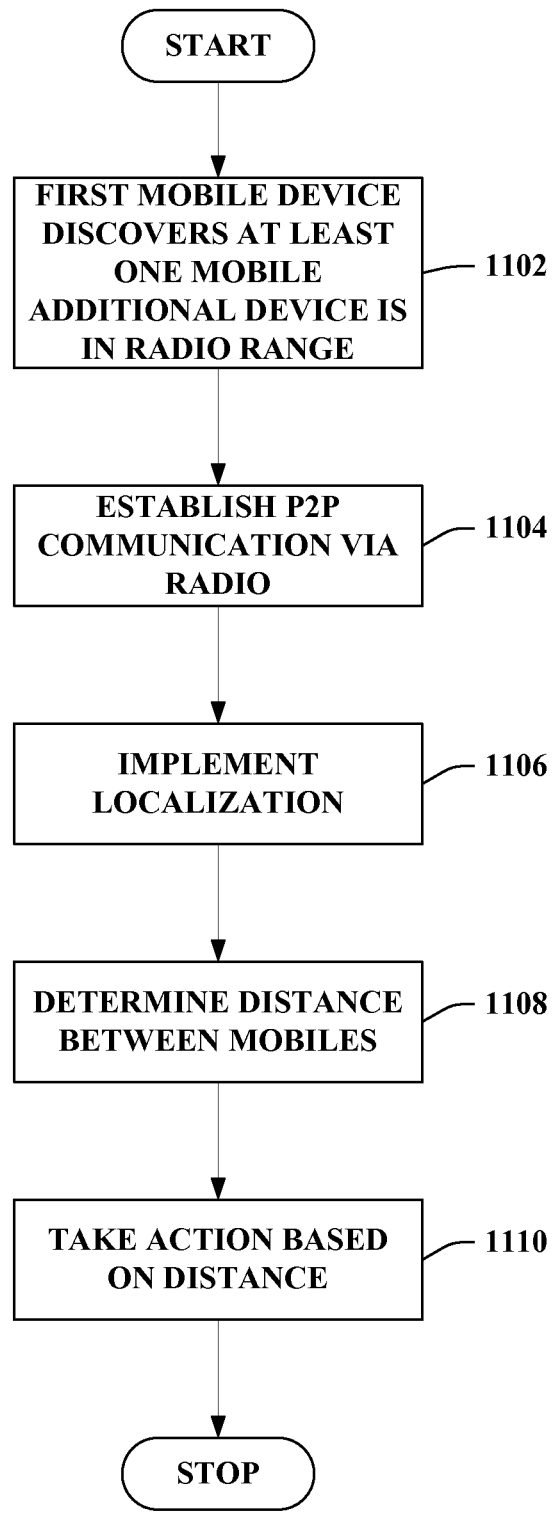
FIG. 11 is an example flowchart illustrating a method of peer localization in accordance with an aspect of the subject innovation.

In view of the exemplary systems described supra, a methodology that may be implemented in accordance with the disclosed subject matter will be better appreciated with reference to the flow chart of FIG. 11. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, the illustrated blocks do not represent all possible steps, and not all illustrated blocks may be required to implement the methodologies described hereinafter.

Referring now to FIG. 11 an example flowchart illustrating a method of peer localization for mobile applications is shown in accordance with an aspect of the subject innovation. At 1102, a first mobile device detects, senses, or otherwise discovers that one or more mobile devices are within a radio communication range of the first mobile device. As previously discussed, the mobile devices can be, for example, cellular phones, smart phones, laptops, handheld communication devices, handheld computing devices, satellite radios, global positioning systems, PDAs, and/or any other suitable device for communicating over one or more wireless communication systems. For example, the first mobile can be a Bluetooth equipped cellular phone carried by a user, wherein the user and phone are located in a shopping area. A second user carrying a similarly enabled cellular phone enters the shopping area, and the first phone discovers the second phone when the second phone is within the Bluetooth range of the first. It is to be appreciated, that this is but one example and most any number of mobile devices could be included within the scope and spirit of this innovation.

At 1104, the mobile devices cooperatively establish peer-to-peer (P2P) communication via one or more radio communication techniques, such as Bluetooth, Wi-Fi, and so forth. The P2P communication allows the mobile devices to transfer data in real time. At 1106, the P2P connected mobile devices can implement localization, wherein the localization allows the mobile devices to detect their location relative to one another. At 1108, the P2P mobile devices can cooperatively determine their distance from one another based on the localization and/or RSSI. In addition, the mobile devices can use multiple radios simultaneously to improve the accuracy of the distance estimations. The mobile devices can estimate the physical distance between them and place themselves on a grid (e.g., two-dimensional, or three-dimensional) relative to each other, without the use of GPS or traditional Wi-Fi infrastructure based localization. Additionally or alternatively, the mobile devices can combine peer-localization with infrastructure based localization (discussed supra), such that the virtual coordinates obtained via the peer-localization can be combined with physical coordinates, where one or more mobile devices has knowledge of their global physical location.

At 1110, the mobile devices can take one or more actions based on the distance between them. For example, the mobile devices can remind, prompt, or otherwise alert a user of the mobile device based on location of the mobile device or the presence of other mobile devices in the near vicinity. For example, if the mobile device detects a second mobile device belonging to Courtney in the immediate area, the mobile device could remind the user to congratulate Courtney on her recent engagement. As another example, the mobile device could use the peer-localization to indicate that friends are nearby, and could display information about the friends, such as photographs. It is to be appreciated that these are but a few examples, and a plurality of possible actions can be taken within the scope and spirit of this innovation.

Figure 12:
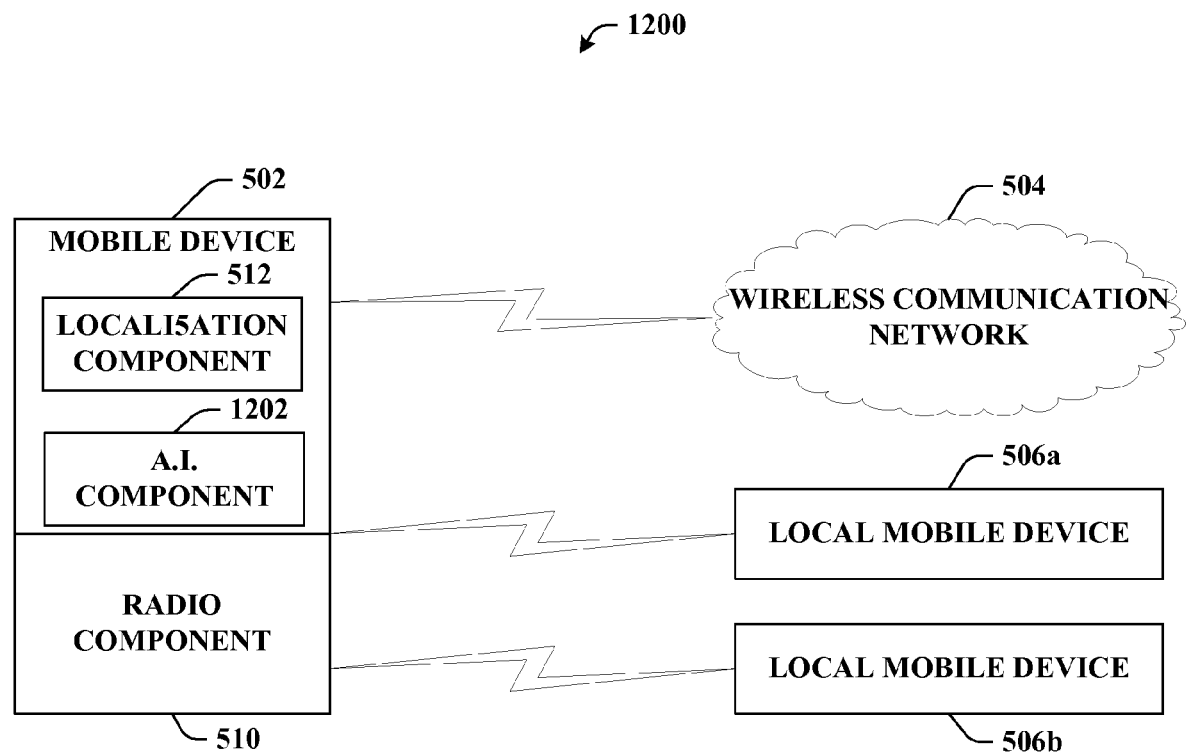
FIG. 12 illustrates a system that employs an artificial intelligence component which facilitates automating one or more features in accordance with the subject specification.

FIG. 12 illustrates a system 1200 that employs an artificial intelligence (AI) component 1202 which facilitates automating one or more features in accordance with the subject innovation. The subject innovation (e.g., in connection with inferring) can employ various AI-based schemes for carrying out various aspects thereof. For example, a process for verifying peer-to-peer localization can be facilitated via an automatic classifier system and process.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when to update or refine the previously inferred schema, tighten the criteria on the inferring algorithm based upon the kind of data being processed (e.g., financial versus non-financial, personal versus non-personal, . . . ), and at what time of day to implement tighter criteria controls (e.g., in the evening when system performance would be less impacted).

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A mobile device, comprising:
a radio component that establishes peer-to-peer communication with an additional mobile device using a plurality of radio technologies concurrently; and
a localization component that:
estimates a first physical distance between the mobile devices based at least in part on first localization data associated with a first of the plurality of radio technologies;
estimates a second physical distance between the mobile devices that is more accurate than the first physical distance based at least in part on second localization data associated with using concurrently the first of the plurality of radio technologies and a second of the plurality of radio technologies, wherein the second localization data is different than the first localization data and the second physical distance is estimated subsequent to the estimation of the first physical distance;
detects a relative position of the mobile device with respect to the additional mobile device based at least in part upon the second physical distance; and
determines a global physical location of the mobile device by combining a global physical location of the additional mobile device determined by the additional mobile device via infrastructure localization with the relative position of the mobile device.

2. The mobile device of claim 1, wherein the radio technologies include at least one of Bluetooth, or Wi-Fi ad hoc technology.

3. The mobile device of claim 1, wherein the localization component determines the global physical location of the mobile device via the infrastructure localization including at least one of GPS, infrastructure based Wi-Fi localization, or triangulation.

4. The mobile device of claim 3, wherein the localization component transposes virtual coordinates obtained by the infrastructure localization into physical coordinates obtained via the radio component.

5. The mobile device of claim 1, wherein a surrogate device scans for other mobile devices, and in response to the surrogate device detecting a new mobile device, the surrogate device signals the mobile device and the additional mobile device to start scanning for the new mobile device.

6. The mobile device of claim 1, wherein the localization component estimates the physical distance between the mobile devices based at least in part on a received signal strength indication of the radio communication.

7. The mobile device of claim 1, further comprising an energy management component that controls energy consumption of the mobile device that is used for discovering other devices via cloud coordination with the other devices, wherein the mobile device queries a web service to determine if any of the other devices are within a discovery range and are active.

8. A method for mobile device localization, comprising:
establishing, by a mobile device, peer-to-peer communication with a first additional mobile device;
enabling multi-hop peer-localization;
estimating a physical distance between the mobile device and the first additional mobile device based on a first distance estimated using a first radio and a second distance estimated using the first radio and a second radio concurrently, wherein the second distance is more accurate than the first distance;
estimating a physical distance between the mobile device and a second additional mobile device based at least in part on multi-hop peer-localization, wherein the multi-hop peer-localization includes stuffing position data of the second additional mobile device into a beacon signal of the first additional mobile device, the mobile device receiving the position data of the second additional mobile device via the first additional mobile device, in which the position data of the second additional mobile device stuffed into the beacon signal of the first additional mobile device allows the mobile device to detect a relative position to the second additional mobile device; and
determining a global physical location of the mobile device by combining a global physical location of the second additional mobile device with the relative position of the mobile device, in which the global physical location of the second additional mobile device is determined by the second additional mobile device via infrastructure based localization.

9. The method of claim 8, wherein establishing the peer-to-peer communication further comprises using two or more radio technologies, wherein the radio technologies include at least one of a Bluetooth, or Wi-Fi ad hoc technology.

10. The method of claim 8, further comprising determining the global physical location of the mobile device using the infrastructure based localization including GPS, infrastructure based Wi-Fi localization, or triangulation.

11. The method of claim 10, further comprising transposing virtual coordinates obtained via the infrastructure based localization with physical coordinates based on the estimated physical distance.

12. The method of claim 8, further comprising managing energy consumption of the mobile device localization via cloud coordination.

13. The method of claim 8, wherein the second distance is estimated subsequent to the estimation of the first distance.

14. A method for mobile device localization, comprising:
establishing, by a mobile device, peer-to-peer communication with at least one additional mobile device via two or more radio technologies concurrently;
estimating a physical distance between the mobile devices based at least in part on a first distance obtained via using a first radio technology and a second distance more accurate than the first distance obtained via concurrently using the first radio technology and a second radio technology, wherein the second distance allows the mobile device to determine a relative position to the at least one additional mobile device;
combining global physical location of the at least one additional mobile device determined by the at least one additional mobile device via infrastructure based localization with the relative position of the mobile device to determine a global physical location of the mobile device; and
managing energy consumption of the mobile device localization via cloud coordination.

15. The method of claim 14, wherein the first and second radio technologies include a Bluetooth or Wi-Fi ad hoc technology.

16. The method of claim 14, further comprising determining the global physical location of the mobile device using the infrastructure based localization including GPS, infrastructure based Wi-Fi localization, or triangulation.

17. The method of claim 16, further comprising transposing virtual coordinates obtained via the infrastructure based localization with physical coordinates based on the estimated physical distance.

18. The method of claim 14, further comprising determining the physical location by multi-hop peer-localization, the multi-hop peer-localization including stuffing position data into a beacon signal.

19. The method of claim 14, further comprising mapping the location of the mobile devices on a grid.

20. The method of claim 14, further comprising using a surrogate device to handle a process of scanning for other mobile devices.

* * * * *